United States Patent [19]
Arterburn et al.

[11] Patent Number: 5,970,837
[45] Date of Patent: Oct. 26, 1999

[54] CHOPPER FOR CUTTING FIBER CONTINUOUSLY, AND METHOD

[75] Inventors: Russell D. Arterburn, Athens, Tenn.; Randall C. Bascom, Wauseon, Ohio; Shawn E. Dennis, Pensacola, Fla.; Douglas J. Kempski, Whitehouse, Ohio

[73] Assignee: Johns Manville International, Inc., Denver, Colo.

[21] Appl. No.: 08/840,044

[22] Filed: Apr. 24, 1997

Related U.S. Application Data

[63] Continuation-in-part of application No. 08/768,451, Dec. 18, 1996, abandoned.

[51] Int. Cl.⁶ ........................................................ B26D 5/08
[52] U.S. Cl. .................................. 83/552; 83/563; 83/564; 83/345; 83/913; 83/13; 29/40
[58] Field of Search ............................... 83/13, 552, 563, 83/564, 345–347, 913; 29/40, 39

[56] References Cited

U.S. PATENT DOCUMENTS

| | | |
|---|---|---|
| 3,668,964 | 6/1972 | Lomas ........................................ 83/347 |
| 3,869,268 | 3/1975 | Briar et al. ................................ 83/347 |
| 3,992,967 | 11/1976 | Fram .......................................... 83/347 |
| 4,043,779 | 8/1977 | Schaefer ..................................... 83/922 |
| 4,045,196 | 8/1977 | Schaefer ..................................... 83/347 |
| 4,083,279 | 4/1978 | Wester et al. .............................. 83/347 |
| 4,287,799 | 9/1981 | Fujita et al. ................................ 83/347 |
| 4,327,620 | 5/1982 | Greinke et al. ............................. 83/552 |
| 4,344,786 | 8/1982 | Symborski et al. ........................ 83/913 |
| 4,551,160 | 11/1985 | Frailey et al. .............................. 83/347 |
| 4,637,286 | 1/1987 | Boggs ......................................... 83/347 |
| 4,655,111 | 4/1987 | Blaker et al. ............................. 83/356.3 |

Primary Examiner—M. Rachuba
Attorney, Agent, or Firm—Robert D. Touslee

[57] ABSTRACT

A new type of multi-chopper for cutting strands or ribbon shaped material such as strands of glass fibers, and a method of using this chopper, is disclosed. The chopper has at least two chopper assemblies on a rotating frame. When one chopper assembly needs repair, the frame is rotated which brings a rebuilt or repaired chopper assembly into operating position quickly and also brings the assembly needing repair into a position where it can be worked on while the other chopper is operating resulting in much reduced downtime. The frame of the chopper can rotate around a vertical or horizontal line, or around a line passing through two opposite corners of a frame.

19 Claims, 13 Drawing Sheets

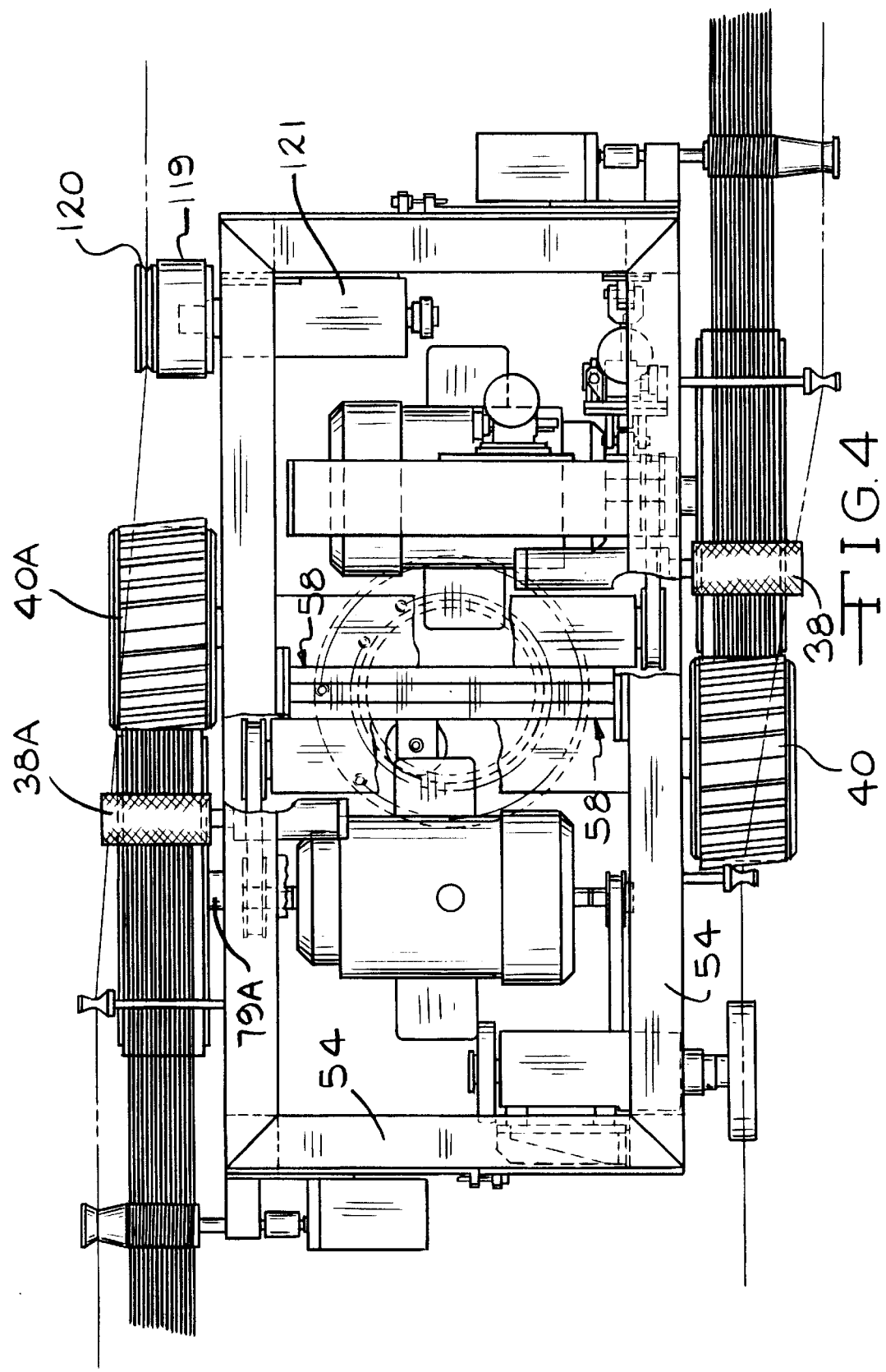

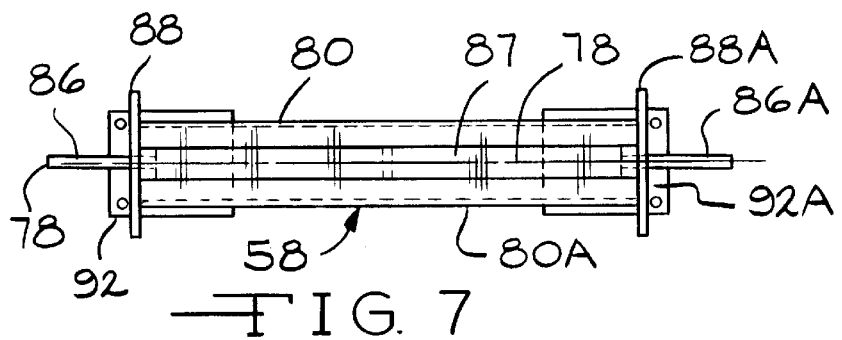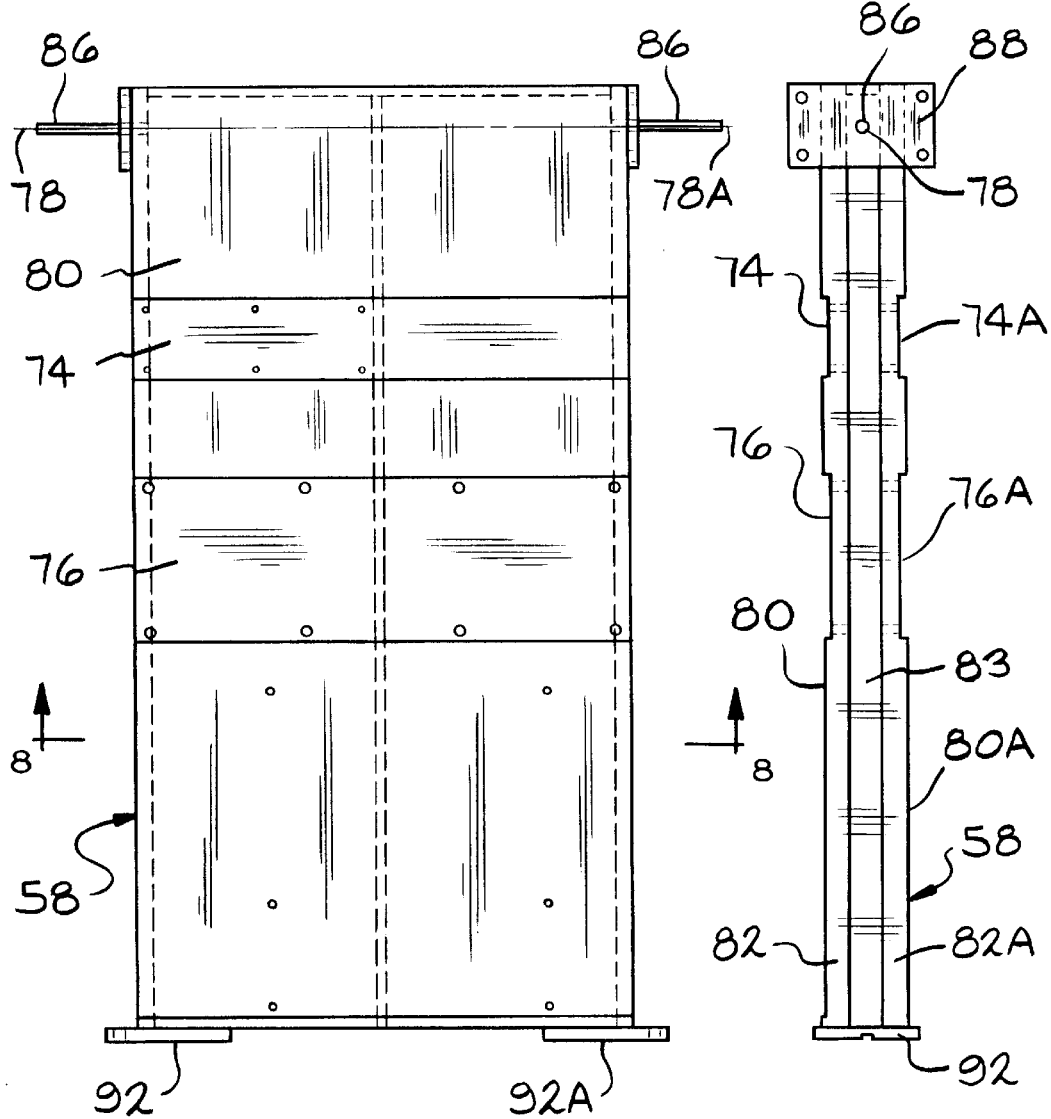

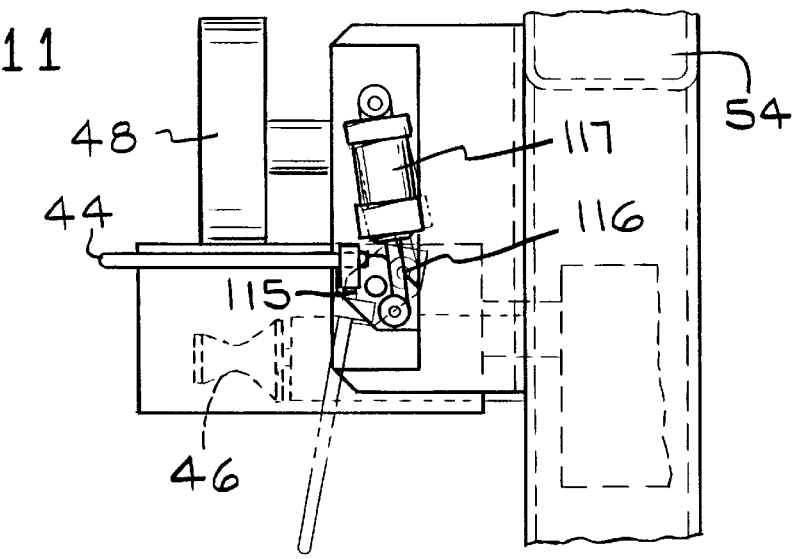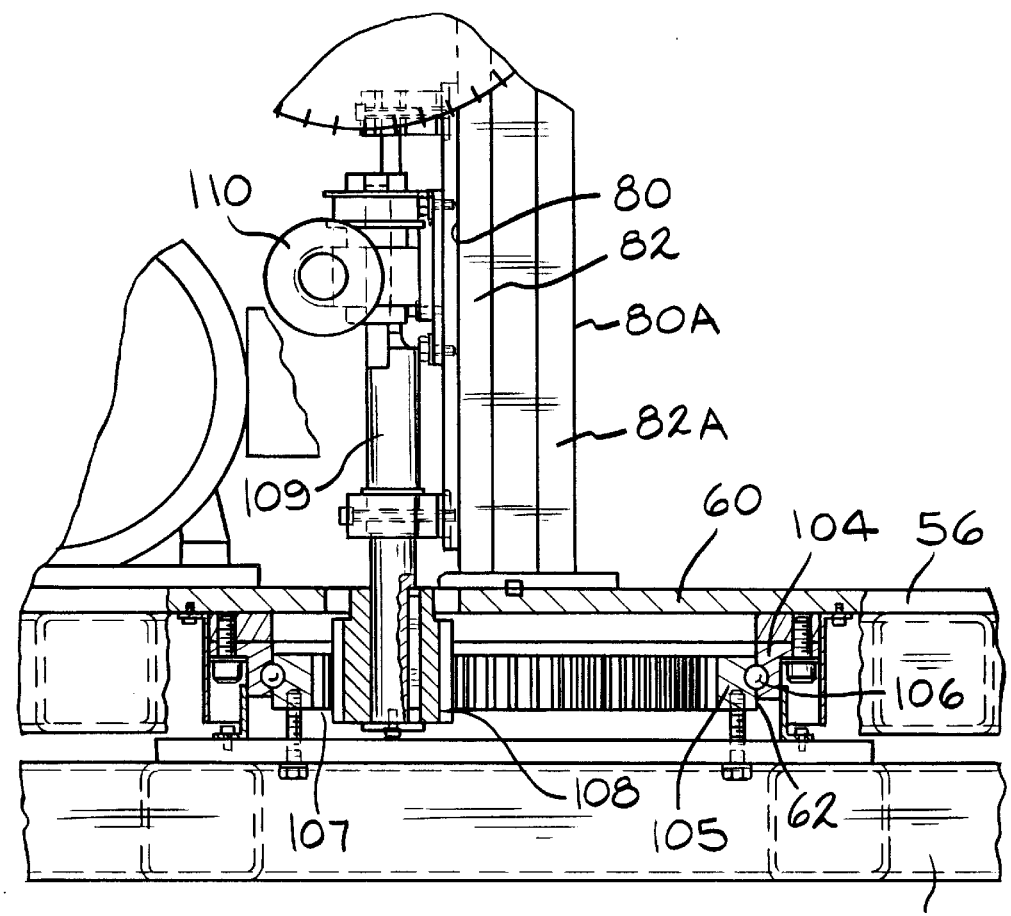

CHOPPER FOR CUTTING FIBER CONTINUOUSLY, AND METHOD

This application is a continuation in part of U.S. application Ser. No. 08/768,451, filed Dec. 18, 1996, now abandoned.

BACKGROUND OF THE INVENTION

The present invention pertains to an apparatus for cutting strands such as mineral fiber like fiber glass, synthetic fibers like polyester or polyethylene and natural fibers like hemp and cotton, or for cutting ribbon like materials, and the method of using the apparatus, particularly to cut glass fiber continuously at high speed. The apparatus is called a multi-chopper because it has at least two chopper assemblies and is a vast improvement over the choppers used heretofore in that it greatly reduces downtime caused by chopper malfunctions or normal wear of the chopper assembly parts.

In processes of making chopped fiber of various kinds, a chopper receives continuously one or more strands made up of a plurality of fibers and chops the strand(s) into short lengths generally ranging from about ⅛th inch to 3 or more inches long. The strand(s) are often moving very fast through the chopper, typically at several thousand feet per minute. One example of such a process is the process of making chopped glass fiber as disclosed in U.S. Pat. Nos. 3,508,461, 3,771,701, 3,815,461, 3,869,268, 4,175,939, 4,249,441, 4,347,071, 4,373,650, 4,398,934, 4,411,180, 4,551,160, 4,576,621, and 4,840,755, which references are incorporated herein by reference. As time progresses blade edges and a backup roll on the chopper deteriorate to the point that the chopper is not cutting cleanly and "double cuts" or incomplete cuts are produced, i. e. one or more individual fibers are not cut leaving the chopped pieces linked together with one or more fibers. Since incomplete cuts are unacceptable, just prior to the elapsed time where incomplete cuts can no longer be avoided or where other factors such as vibration become serious, the chopper is shut down and the old backup roll and/or old blade roll are removed and replaced with rebuilt or new backup and/or blade rolls. This procedure requires at least 5–8 minutes and frequently more time, especially when it is necessary to replace another part on the chopper.

While the chopper is shut down for rebuild or repair, the fiber continues to issue from the fiberizing bushings on the line serviced by the chopper and must be sent to the basement as scrap, since it is impractical to stop the bushings from fiberizing. Also, the thermal balance on the fiberizing tips of the bushings are impacted negatively when the chopper is shut down because less external air is drawn into the tip area by the slow moving fibers as compared to when the chopper is pulling the fibers at thousands of feet per minute. This condition, it is believed, causes the thermal equilibrium of the bushing to be disturbed, and causes the glass exiting the tips to change temperature. If a chopper is down for more than a few minutes, this will cause the strand to break out (caused by fibers breaking) numerous times for many minutes after the chopper is back on line. This condition is sometimes referred to as "false starts" and this undesirable situation results in a significant reduction in fiberizing efficiency, i.e. a percentage obtained by dividing the weight of good fiber produced in a given period of time by the weight of molten glass that exited the bushings in the same period of time. Overheated bushings caused by chopper down times of 5 minutes or more can reduce fiber efficiency significantly for 10–20 minutes or more after the chopper is back on line. Also, while the bushings are "hanging", i.e. not fiberizing at high strand speed, such as when the strands are not being pulled at a speed of at least 1000 feet/minute by the chopper, etc., the melt rate of the bushings that are "hanging" drops significantly which changes the pull rate on the melter and upsets the equilibrium of the melter reducing glass quality and fiberizing efficiency.

The chopper has to be rebuilt on a regular basis and the time between rebuilds will vary depending on the diameter of the fiber being chopped, the type of chemical sizing on the surface of the fiber (most contain lubricants that complicate chopping), the condition of the chopper, the speed of chopping, and the quality of the lowest quality portion of the lowest quality blade edge or backup roll. Typical life times of blade rolls/backup rolls are in the range of 6–36 hours, depending on the type of fiber being chopped as explained above. A chopper typically services about 8–15 bushings, each putting out 100 or more pounds of fiber per hour, 24 hours per day and 7 days per week and a typical operation will have 8–20 choppers operating. Chopper down time typically costs at least ten dollars per minute per chopper. It can be readily seen that substantially reducing the down time of the choppers during rebuilds or repair will have a substantial positive financial impact on the operation.

This problem of substantial downtime of fiberization due to rebuilds of the choppers has persisted for many years in spite of the very substantial financial incentive to reduce or eliminate the problem.

BRIEF SUMMARY OF THE INVENTION

The present invention is a new multi-chopper (indexing or tandem chopper) apparatus for chopping fibers and fiber strands comprising a rotatable frame, said frame having a three dimensional shape, preferably a polyhedron, having at least three sides, and preferably a bottom and a top, and having a first chopper assembly connected to said frame and adjacent one side of said frame and also having a second chopper assembly connected to said frame and adjacent a second side of said frame, said frame being rotatable to move said first chopper assembly out of an operating position and into a non-operating position while moving said second chopper assembly out of a non-operating position and into said operating position.

The multi-chopper has two or more chopper assemblies, preferably complete chopper assemblies including a drive or drives, mounted in or on opposite portions of a common frame, which frame is rotatable about an axis or line to put a first chopper assembly into an operating position and then is further rotatable in the same or reverse direction to put a second chopper assembly into an operating position.

While the rotation to put the second chopper assembly, a newly rebuilt chopper assembly, into position can always be in the same direction, it is preferred to first rotate or index one direction, such as clockwise, and then to reverse the direction, counter-clockwise, to put the second, newly rebuilt, chopper assembly into operating position.

While it is preferred to rotate or index the chopper of the invention around a vertical line, it is also within the scope of the invention to rotate or index the chopper around a horizontal line, diagonal line or any line or point that will move the first chopper assembly out of position while moving the second chopper assembly into position for operation, and vice versa. For example, when the multi-chopper is in the form of a cube, the multi-chopper can be rotated around a line that runs through the mid-points of an upper edge of the cube, which edge spans between two chopper assemblies, and a lower edge of the cube, which lower edge spans between two chopper assemblies.

It is also preferred to equip the multi-chopper with a positive stop device to stop the rotation at the correct place where a chopper assembly is in the proper operating position. It is further preferred to equip the multi-chopper with a locking mechanism that will hold the multi-chopper in a desired correct operating position while the multi-chopper is operating and chopping.

A chopper assembly includes a blade roll and a backup roll and preferably a separate drive. The chopper assembly can also include an optional idler roll for holding the fiber strands against the outer surface of the backup roll to keep the strands from slipping on the backup roll and reducing the pulling speed of the strands and causing undesirable fiber diameters and chopped lengths. The idler roll extends beyond the outer edge of the backup roll. The strand chopper assembly can also include an optional new strand starting system which includes a first starter roll or shoe, a starter bar, a second starting roll or shoe and an accelerating roll. A shoe is a U or V grooved roll or roll segment or a roll flanged on one end that either doesn't rotate, or if it does, at a very low surface speed and probably in the opposite direction that the strands are moving or a roll that turns with a minimum resistance producing a surface speed similar to the moving strand in contact with the shoe. The shoes are made of low friction, long wearing materials like graphite, bronze or high density epoxy resin impregnated linen fabric composites like Micarta™.

The frame can be mechanically or magnetically locked into a particular position such that forces exerted by its operation will not further rotate the frame. The chopper assembly that is out of position can be shut down, locked out, and rebuilt and/or repaired while the other chopper assembly that is in position is operating.

When the operating chopper assembly needs repair or rebuilding, the chopper assembly on the opposite side of the frame is ready for operation and is easily and quickly moved into position by releasing and rotating the frame after the strands of fiber have been removed from the operating chopper, and preferably placed in a conventional pull roll assembly (not shown). The strands of fiber are then quickly fed into the rebuilt and/or repaired chopper assembly, reducing the downtime of the fiberization due to chopper rebuild/ repair to a fraction of what has been required previously, for example typically from an average of about 8 minutes or more with the prior art choppers to an average of about 2 minutes or less with the chopper of the present invention.

Two methods of starting a new strand into the chopper are disclosed. The first method utilizes a mechanical finger or starter bar that engages the strand after the new strand is up to desired speed and pulls the new strand onto a backup roll where it will be carried into a chopping position. The second method dispenses with the mechanical finger, slightly changes the path of the new strand, and uses the operator to move the strand into position after it is up to speed, where it will be carried into the chopping position. This latter arrangement and method is novel and is a preferred option to the present invention.

The preferred starting arrangement for a new strand comprises a first starting roll or shoe located between an axis of the backup roll on the chopper, a second starting roll located beyond and above the chopper roll and an accelerator roll, said first starting roll having an escapement for the new strand and located such that at least a portion of the path of said strand passing between the first starting roll or shoe and the second starting roll extends beyond the vertical plane made by the outer vertical face of said backup roll. The method of using this preferred starting arrangement comprises placing the new strand in a starting area on the bottom side of an oscillating roll, up over the starting area of the first starting roll, under the starting area of the second starting roll and up over the accelerator roll and tripping a starting switch which starts the acceleration of the accelerator roll, waiting until the accelerator roll is up to the desired full speed, then moving the running strand just before the oscillating roll down beyond the outer diameter of the oscillating roll, then moving the running strand to alignment with a desired groove in a grooved portion of the oscillating roll, which action will move the strand off of the end of the first starting roll and onto the backup roll and under the idler roll where the new strand will enter the chopping nip and be chopped continuously, and then allowing the running strand to rise into the desired groove on the oscillating roll.

The multi-chopper preferably comprises a frame having a centrally located mast with a blade roll and an idler roll mounted on each side of the mast in a precise manner. The mast has machined, horizontal slots on opposite faces of vertical members of the mast for receiving bearing mounts for the axles of the blade rolls, or in the alternative, the back up rolls, and the idler rolls. This arrangement assures that the rolls mounted on the mast are aligned properly and stay aligned. In the alternative where the backup rolls are mounted to the mast, the backup rolls are driven and the blade rolls are pivotly mounted to the frame of the chopper.

BRIEF DESCRIPTION OF THE SEVERAL VIEWS OF THE DRAWINGS

FIG. 4 is a plan view of the multi-chopper shown in FIGS. 2 and 3 also with an enclosure removed.

FIG. 5 is an end view of a vertical mast element of the multi-chopper shown in FIGS. 3 and 4.

FIG. 6 is a front view of the mast shown in FIG. 5.

FIG. 7 is a plan view of the mast shown in FIGS. 5 and 6.

FIG. 10 is an enlarged front view of a portion of the multi-chopper shown in FIG. 3, with a portion cut away to show a drive mechanism for rotating one chopper assembly out of the operating position and into a reserve position and a second chopper assembly out of the reserve position and into the operating position.

FIG. 11 is an enlarged partial end view of the multi-chopper shown in FIG. 3 showing one element of a mechanism for starting a new strand.

DETAILED DESCRIPTION OF THE INVENTION

Figure 1:
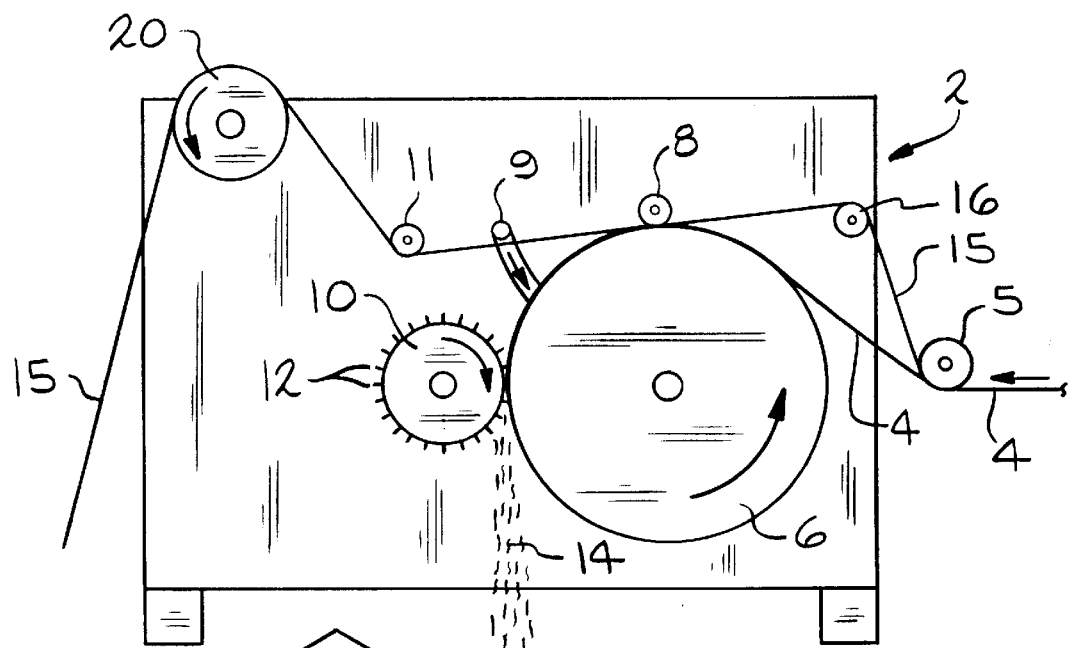
FIG. 1 is a front view of a prior art chopper, with a vertical down discharge.

FIG. 1 shows a front view of a typical prior art chopper 2 used in making chopped glass fiber. This chopper, like all prior art choppers, has only one chopper assembly. One or more, usually eight or more, glass strands 4, each strand containing 400–6000 or more fibers having water or an aqueous chemical sizing on their surfaces, are pulled by a backup roll 6, in cooperation with a knurled idler roll 8, into the chopper 2. The strands 4 first run under a grooved oscillating roll 5, preferably with one strand in each groove, and upward and over the outer surface of the backup roll 6. The working surface of the back up roll 6 is typically made of urethane and is wider than the oscillating path of the glass fiber strands. The strands 4 then pass under a knurled idler roll 8 which is pressed against the strands at a desired pressure to enable pulling of the glass fiber strands into the chopper. The strands generally remain on the surface of the backup roll 6 and next pass into the nip between the backup roll 6 and a blade roll 10 having razor blade like blades 12 mounted therein, such as is shown in U.S. Pat. No. 4,249,441, where the strands are usually cleanly cut into chopped strand 14 having the desired length.

The chopper 2 also has a system for starting a new strand 15. As is known, when a new strand is started, the fibers in the strand do not have the desired diameter until the strand is running away from the bushing at the same speed that the other strands are running. If a new strand is put into the normal chopper path by the person starting the strand, two undesirable things will happen. Often the jerk on the strand caused by accelerating the strand from a few feet per minute to several thousand feet per minute instantaneously will break fibers coming from the bushing, called a bushing or fiber break out. Each break out requires a new strand to be started again after the bushing has beaded down. But, even if the bushing doesn't break out, the diameter of the fiber in the first 8–40 feet of the strand will be very large and out of specification. Therefore it is important to get the strand up to normal pulling speed before inserting the strand into the chopper.

To accomplish this, typically when a new strand 15 is brought to the chopper, it is placed under an outermost portion of the oscillating roll 5, over a first starting roll or shoe 16, under an outermost portion of the idler roll 8, under a second starting roll or shoe 11 and over an accelerator roll 20, which is driven and is activated by the operator as the strand 15 is placed over the accelerator roll 20. The outermost portions of the oscillating roll 5 and the starter roll 16 are generally in the same plane, which plane lies outboard of the zones defined as between the planes formed by each vertical face of the blade roll 10 and the backup roll 6. The outer portion of the idler roll 8 and the starter bar 9 are also outside this zone, but the turning roll 11 and the accelerator roll 20 are inside this zone. The oscillating roll, or guide roll as it is sometimes called, is well known as can be seen in U.S. Pat. Nos. 3,771,701, 3,815,461, 4,048,861 and 4,551,160.

The accelerator roll 20 can be always running at a slow speed and when a new strand is laid over this roll, it accelerates at a desired rate to the normal pulling speed to gently accelerate the strand 15 up to the desired pulling speed. The strand 15, after passing over and part way around accelerator roll 20, flies off the accelerator roll 20 and falls generally vertically through a hole in the floor to a scrap collector in the basement or into a scrap container (not shown) sitting by the chopper. When the strand 15 has been running at the proper speed for a desired time, a starter bar 9 moves downwardly in an arch path contacting the strand 15 to move it into the zone or zones defined as between the planes formed by the faces of blade roll 10 and backup roll 6 and into contact with the running strands and/or the surface of the backup roll 6. With the action of bar 9, strand 15 is pulled into a nip between the backup roll 6 and the blade roll 10 to cause the strand 15 to be pulled along with strands 4 to the chopping section at which time strand 15 is cut. Once cut, the portion of strand 15 to the left of said nip is pulled away from the blade roll 10 by accelerator roll 20. When strand 15 is cut, accelerator roll 20 pulls the free end of the strand away from the blade roll 10 and disposes of it into the scrap chute. After a set period of time the drive to accelerator roll 20 is slowed down or shut down to await start up of the next strand.

The blade roll 10 and the backup roll 6, optionally with the idler roll 8 and a system for starting a new strand, constitute a chopper assembly. The choppers used in the fiber industry have only one chopper assembly.

The problem with the prior art choppers, as above, is that the blade roll 10 and the backup roll 6 have to be replaced every 6–36 hours and occasionally at even shorter intervals if there is something wrong with the rebuilt rolls or another part of the chopper. When the chopper goes down or is shut down, the production from the line of bushings serviced by that chopper will be lost for usually at least about 8 minutes and additional production will be lost because of lower than normal fiberizing efficiency for a significant time period, the amount depending on how long the chopper was down, after the chopper is started back up. The amount of production lost due to lower fiberizing efficiency is dependent upon how long the chopper is down. The present invention allows a shut down of only a minute or two, producing a large increase in productivity compared to a shutdown of 8 minutes or longer, and has a very positive effect on melter and molten glass stability and consistency.

Figure 2:
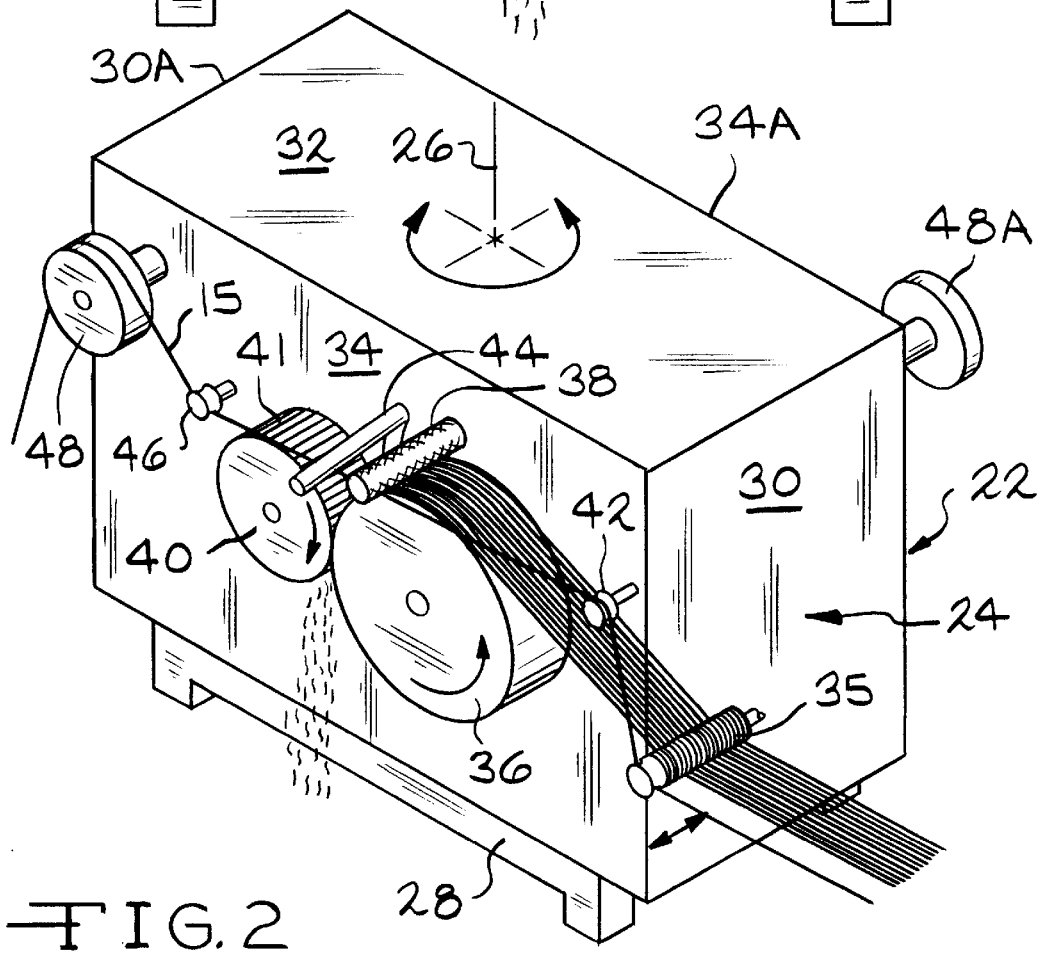
FIG. 2 is a perspective view of one embodiment of a multi-chopper made according to the present invention.

FIG. 2 is a perspective view of one embodiment of the present invention. Here a multi-chopper 22 comprises at least two separate chopping assemblies mounted on a frame (not shown) that is inside an enclosure 24, the frame being rotatable on a supporting base 28 around a vertical line, preferably a vertical axis 26 of the frame. The enclosure 24 includes two ends 30 and 30A, a top 32 and two sides 34 and 34A. Adjacent each end 30 and 30A of the enclosure 24 is a strand separator roll 35 having near its outer end a groove for starting a new strand; however only one strand separator roll is required if it is mounted to the floor or other structure near the chopper, the latter configuration being preferred. Also, adjacent each side 34 and 34A of the enclosure 24 there exists a chopper assembly including a backup roll 36, a blade roll 40 with chopping blades 41 and optionally an idler roll 38 having a knurled surface, an optional starter roll 42, an optional starter bar 44, an optional turning roll 46, and an optional accelerator roll 48.

Figure 3:
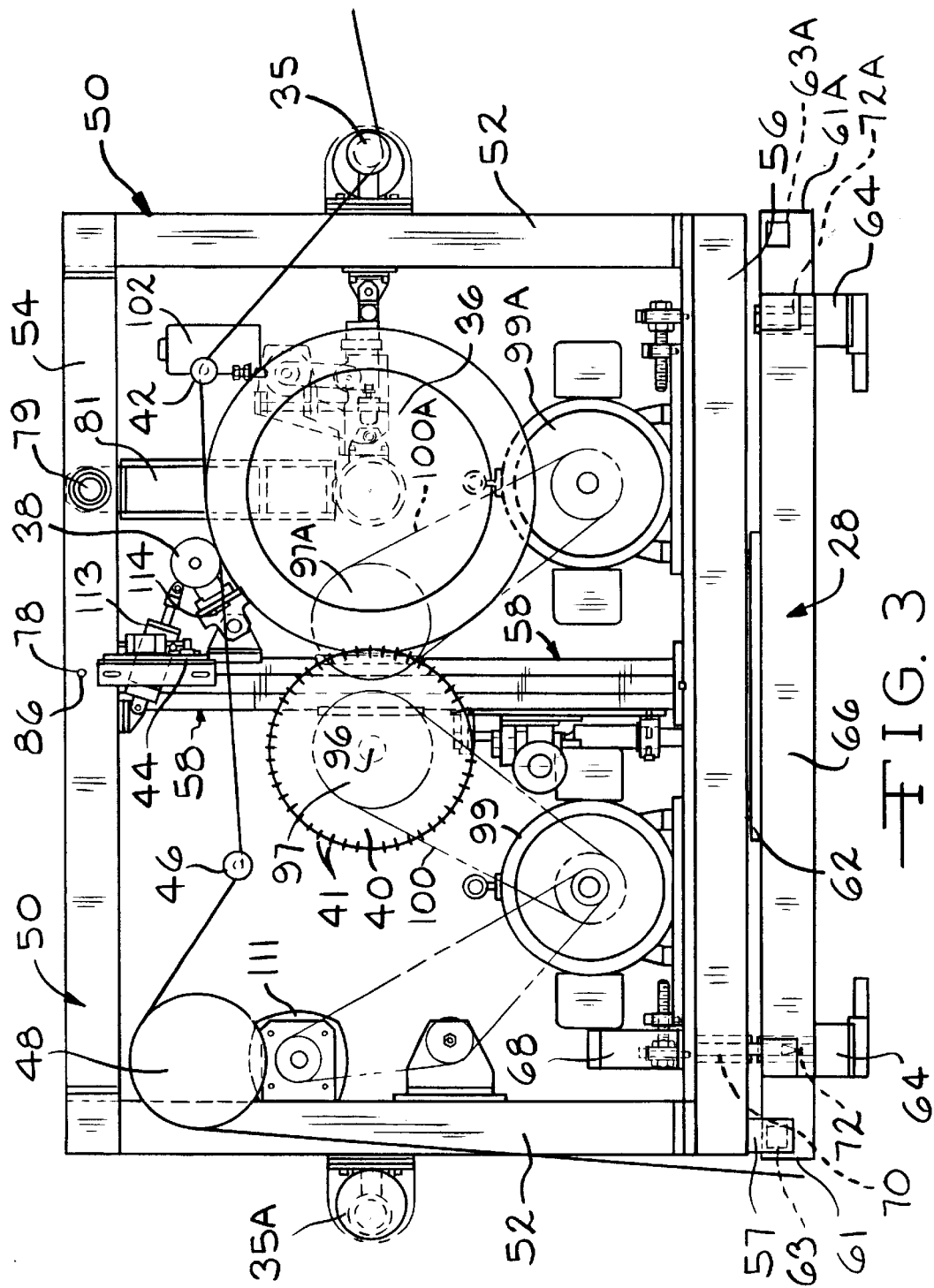
FIG. 3 is a partial front view of the multi-chopper shown in FIG. 2, but with an enclosure removed, and also illustrating an optional mechanism for pulling and accelerating a new strand.
Figure 8:
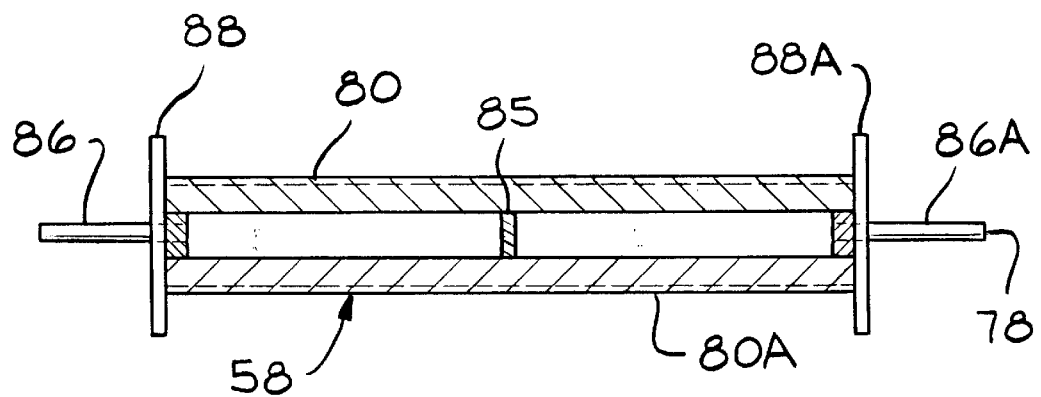
FIG. 8 is a cross section of the mast shown in FIGS. 5–7 taken at lines 8—8 in FIG. 5.

FIG. 3 is a front view of the multi-chopper shown in FIG. 2, and FIG. 4 is a plan view of the same multi-chopper with the enclosure removed to show a frame 50 and other elements of the multi-chopper. The frame can be any one of several configurations as the skilled machine designer can see, but the preferred frame 50 configuration shown in FIGS. 3 and 4 forms a rectangular or square box having a vertical post 52 at each corner. The top end of each post 52 is rigidly attached to an upper rectangular or square frame member 54 and the bottom of each post is rigidly attached to a lower rectangular or square frame member 56. The chopper assemblies and a mast 58 are attached to the frame 50 and to a base plate 60 that is attached to the top of the lower frame member 56.

The frame 50 is attached to a fixed supporting base 28 with a rotatable member 62 which allows the frame 50 to rotate above the fixed supporting base 28. Any pedestal or stand capable of supporting the multi-chopper is suitable and it can be removable, as the supporting base 28 shown, or it can be permanently mounted to the floor. The supporting base 28 is preferred because it has short legs 64 at each corner of the supporting base 28 which creates clearance between the floor and a platform 66 of the supporting base allowing prongs of a lift truck to pass under the platform 66 to lift the multi-chopper and move it into or out of position when desired.

In the preferred embodiment shown in FIG. 3, an optional positive stop system is attached so that when the chopper is rotated or indexed to move one chopper assembly out of the operating position and the other chopper assembly into operating position, the rotation will stop with the operating chopper assembly in the proper operating assembly. Many types of well known mechanisms can be used to do this. In the embodiment shown, a striker plate 57 is attached to the underneath side of one end of the frame member 56 with the center line of the striker plate 57 aligned with the front to back center line of the frame member 56. The striker plate 57 is mounted on or beyond the outer edge of the frame and extends downwardly far enough to contact positive stops mounted on the lower frame. The positive stops comprise stop plates 61 and 61A mounted on opposite ends of the base 66, which plates extend out perpendicular to end members of the base far enough to engage the striker plate 57. A bumper pad 63 is mounted on the stop plate 61 and a bumper pad 63A is mounted on the stop plate 61A to cushion the stop. The bumper pads can be polyurethane of various thickness, such as one-half inch. The stop plates 61 and 61A are located along the length of the ends of the base 66 at the correct locations such that the bumper pad on the stop plate will contact the striker plate 57 when a chopper assembly is in the correct operating position. To avoid interference of the striker plate 57 with the front corners of the lower frame member 56 as the frame 50 is rotated, either the front corners of the frame member 56 can be chamfered, or the striker plate 57 can be pivoted or retracted during the potential interfering portion of the index and then returned before completion of the index, or the striker plate 57 can be mounted outboard of the lower frame member 56, all in well known ways.

In the preferred embodiment, an air cylinder 68 and rod 70, located on one corner of the frame cooperate with two holes 72 and 72A (not shown), located near two corners of the platform 66 and aligned with the rod 70 when the multi-chopper is in an operating position, lock the frame in the proper position with respect to the stand 60 to maintain proper alignment of the operating chopper assembly. The cylinder 68 is spring loaded to keep the rod 70 in one of the holes 72 until the frame 50 is ready to be rotated on the supporting base 28, at which time air pressure is applied to the rod end of the cylinder 68 to withdraw the rod 70 from the hole 72. When the frame 50 has been rotated to bring the rebuilt chopper assembly into the operating position, preferably by the striker plate 57 making contact with a bumper pad 63 or 63A, the air pressure is relieved and the spring in the cylinder 68 reinserts the rod 70 into the other hole 72A.

As can be seen in the Figures, the non-operating chopper assembly is in an opposite orientation compared to the operating chopper assembly. For example, as can be seen in FIG. 2, the non-operating accelerating roll 48A is near the upstream end of the multi-chopper 22 while the operating accelerator roll 48 is near the downstream end of the machine. Also, as can be seen in FIG. 4, the operating back up roll 36 is nearest the upstream end of the multi-chopper 22 while the non-operating back up roll 36A is nearest the downstream end of the multi-chopper. This reverse orientation of the elements, with respect to upstream and downstream ends of the machine, is necessary so that the elements of the chopper assemblies will be in the proper orientation when the non-operating chopper assembly is rotated into an operating position.

A vertical mast 58 is generally centrally located in the frame 50, being rigidly attached at each side at the bottom to the lower rectangular or square frame member 56 and being attached at each side at the top to the upper rectangular or square frame member 54. Referring also to FIGS. 5–8, the mast 58 is constructed to be very rigid and to present first vertical inset surfaces 74, 74A, and second vertical inset surfaces 76 and 76A that are precisely located and aligned with respect to locating pin axis 78 and pivot axes 79 and 79A (not shown) for arms 81 (FIG. 3) and 81A (not shown) to support the backup roll 36(described later) on the frame 50, and so that these locations and alignment is maintained during operation.

The first inset surfaces 74 and 74A and the second inset surfaces 76 and 76A are inset from large outer vertical surfaces 80 and 80A of the mast 58. The large surface 80A is on the opposite outside of the mast 58 from the large surface 80, the first inset surface 74A is parallel to and on the opposite side of the mast 58 from the first inset surface 74, and the second inset surface 76A is parallel to and on the opposite side of the mast 58 from the second inset surface 76.

The mast 58 comprises two large rigid vertical members 82 and 82A, which rigid members have the large outside surfaces 80 and 80A that are parallel to each other, and which contain the first vertical inset surfaces 74 and 74A respectively and also the second vertical inset surfaces 76 and 76A respectively. The mast also comprises small rigid vertical members 83 that completely fill a gap 84 between the large rigid vertical plates 82 and 82A on each small side of the mast 58 and extend into the gap at least one inch and preferably at least 1.75 inches. A vertical brace 85 is welded or bolted into the center of the gap 84 and preferably is at least one inch wide and most preferably at least 1.75 inches wide. Horizontal inserts 87 and 87A are welded or bolted into the gap 84 at the top and bottom of the mast surrounded by elements 82, 82A, 83 and 83A. The horizontal inserts are at least 0.25 inch thick and preferably at least 0.5 inch thick. The mast 58 attaches to the upper frame members 54 and 54A of the frame 50 with vertical attachment plates 88 and 88A, each welded or bolted to an upper corner of the mast 58, respectively, but any attachment means that would rigidly secure the mast 58 to the frame 50 would be suitable. The mast 58 attaches to the lower frame members 56 and 56A of the frame 50 with horizontal attachment plates 92 and 92A welded or bolted to the lower corners of mast 58, respectively, but again, any attachment means that would rigidly secure the mast 58 to the frame 50 would be suitable. The mast is made of a strong, rigid material like steel or aluminum.

Locating pins 86 and 86A extend from the upper sides of the mast 58, being screwed into threaded holes in the vertical attachment plates 88 and 88A, and extending through aligned holes in the upper frame members 54 and 54A. The axis 78 of the locating pins 86 and 86A and the locating pins 86 and 86A are used to align and to check the alignment of the mast 58, the axis of the blade rolls 40 and 40A and the axis of the back up rolls 36 and 36A and the axes of other rolls to check for proper alignment which is very important for good chopping and long life of the wearable parts. The locating pins 86 and 86A can be of various lengths for measuring different things and can be removed during operation if desired.

Figure 9:
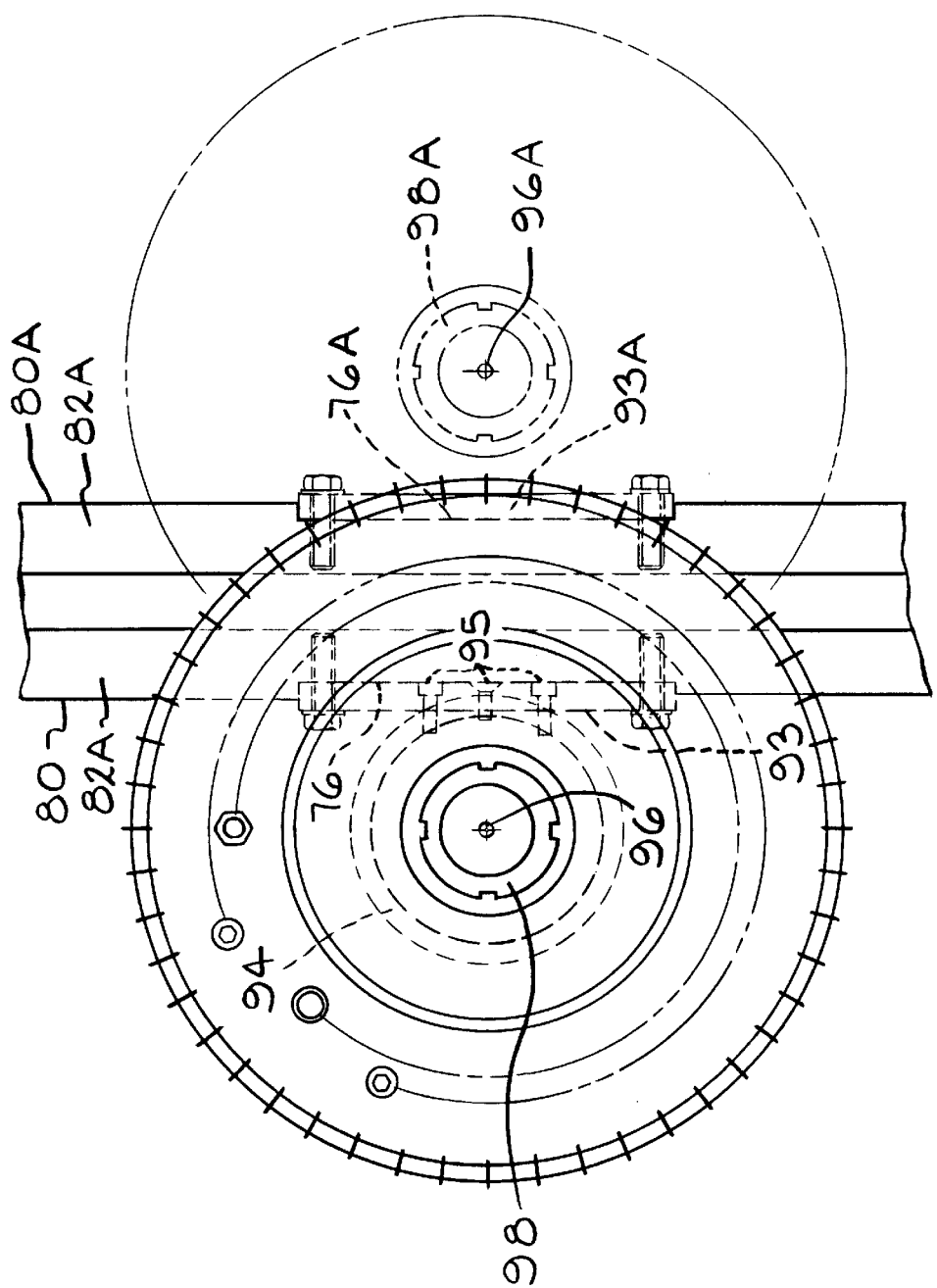
FIG. 9 is an enlarged partial front view of a portion of the multi-chopper shown in FIG. 3 showing how the blade rolls of the two chopper assemblies mount onto the vertical mast.

FIG. 9 shows how the second inset vertical surfaces 76 and 76A serve to properly position the axis of the blade rolls 40 and 40A. The second inset vertical surfaces 76 and 76A are machined into the large outer vertical surfaces of the mast 58 such that when the mast 58 is installed in the frame 50, the surfaces are precisely positioned to match up with a machined base of mounting plates 93 and 93A of assemblies of the blade rolls 40 and 40A. Bearing housings 94 and 94A (not shown) are rigidly and securely attached to the mounting plates 93 and 93A with bolts 95 and/or equivalent welds. Shafts 96 and 96A, having pulleys 97 and 97A (see FIG. 3) attached inboard and threaded on their outboard ends, carry the blade rolls 40 and 40A and are rotatably held in place with bearings (not shown) in the bearing housings 94 and 94A. The blade rolls 40 and 40A are retained on the shafts 96 and 96A with nuts 98 and 98A tightened against outer faces of blade rolls 40 and 40A. The axis of the shafts 96 and 96A are marked on the outboard end of the shafts for position checking. The structure of the blade rolls is well known as evidenced by U.S. Pat. No. 4,249,441, the disclosure of which is hereby incorporated by reference. Other known blade roll structures can also be used.

The blade rolls 40 and 40A are driven by drives 99 and 99A and one or more drive belts 100 and 100A. A timing type belt is normally used as the drive belt, but V belts can also be used.

Referring again to FIG. 3, the backup roll 36 is pivotly supported by a wide rigid arm 81 that pivots on a pivot arm shaft 77 having the axis 79. The backup rolls 36 and 36A, which can be separately driven, but preferably are driven by contact with the driven blade rolls 40 and 40A respectively, have an outer layer 101 of elastomeric material like polyurethane in a known manner. The outer layer 101 of the backup roll 36 is biased into the blades 41 of the blade roll 40 using a biasing means like a screw jack 102, preferably a motorized screw jack like those supplied by Duff Norton of Charlotte, N.C., and a pivoting guiding arm 103 pivotly mounted to a cross member (not shown) spanning two of the vertical posts 52 at the ends of the frame 50. This allows a desired level of bias at all times. The screw jack 102 can be replaced with a fluid cylinder or other known biasing means. The accelerating rolls 48 and 48A are driven by the main drives 99 and 99A respectively through reducing gearboxes 111 and 111A with auxiliary drive belts 112 and 112A.

The idler rolls 38 and 38A are not driven separately, but rotate by being biased onto the surface of backup rolls 36 and 36A respectively with first fluid cylinders 113 and 113A respectively. Each of idler rolls 38 and 38A rotate on a shaft attached to a pivoting roll mount 114, or 114A, which is pivotly mounted at its base with a clevis attached to the large outer vertical surface 80 of an upper portion of the mast 58. The first fluid cylinder 113 has the cylinder clevis mounted to the underneath side of the upper frame member 54 and the rod end attached to the pivoting mount 114 to bias the idler roll 38 against the outer or working surface of the backup roll 36. The surface of the idler roll 38 is preferably knurled in a known manner to prevent fiber wrap.

Referring now to FIG. 10, the frame 50 and the chopper assemblies are mounted on the platform 66 with a rotatable member 62, such as a Kaydon K-Series turntable bearing. This is a type of rotatable member as is used to mount cranes onto their wheeled base, but smaller and lighter in design since the loads here are less demanding. The preferred rotatable member 62 comprises an outer ring 104 with a flange for bolting or otherwise attaching to the underneath side of the base plate 60, an inner ring 105 which bolts or otherwise attaches to the platform 66. The outer ring 104 and the inner ring 105 are so shaped to form a hardened raceway 106 therebetween which contains ball bearings, enhancing rotation. Also, the inner surface 107 of the inner ring 105 is an integral gear that meshes with a driven gear 108. The driven gear 108 is mounted on a vertical shaft 109 which is rotated with a small drive 110 when it is desired to rotate the chopper assemblies to move one chopper assembly out of position and the other chopper assembly into position.

FIG. 11 shows a known device for inserting a new strand into the chopper automatically after the strand has been accelerated to the desired speed by the accelerating roll 48. The strand inserting device comprises the starter bar 44 attached to a rotating plate 115 which rotates around a pin 116 when a second fluid cylinder 117 is activated. The rotation of the plate 115 by cylinder 117 through about 90 degrees pivots the starter bar 44 down and towards the nip between the blade roll 40 and the backup roll 36. This movement causes the starter bar 44 to engage the new strand 15 running between the starter roll 42 and the turning roll 46 (see FIG. 2) causing it to be pulled down the length of the idler roll 38 into the nip between the idler roll 38 and the backup roll 36 and then down into the nip of the blade roll 40 and the backup roll 36 where the chopping takes place. As soon as the new strand 15 is cut by the blade roll 40, that portion of the strand 15 down stream of the blade roll 40 is removed from the chopper assembly by the accelerating roll 48.

FIG. 4 shows an optional device that can be used in place of the accelerating roll 48 to accelerate the new strand 15. This accelerating device comprises a rotating collet 119 having a valley portion 120 near the outer end of the collet 119. The collet 119 is direct driven by a separate drive 121, or it can also be driven in the same manner as the accelerator roll 48. When the rotating collet is used, the new strand 15 is first threaded up as shown in FIG. 2 in the same manner as previously described, except the strand is now wound around the valley portion 120 of the rotating collet 119 and the collet then speeds up to accelerate the new strand 15. After the new strand is inserted into the chopper, the collet 119 is stopped and the portion of strand remaining on the collet 119 must be removed and discarded.

Figure 12:
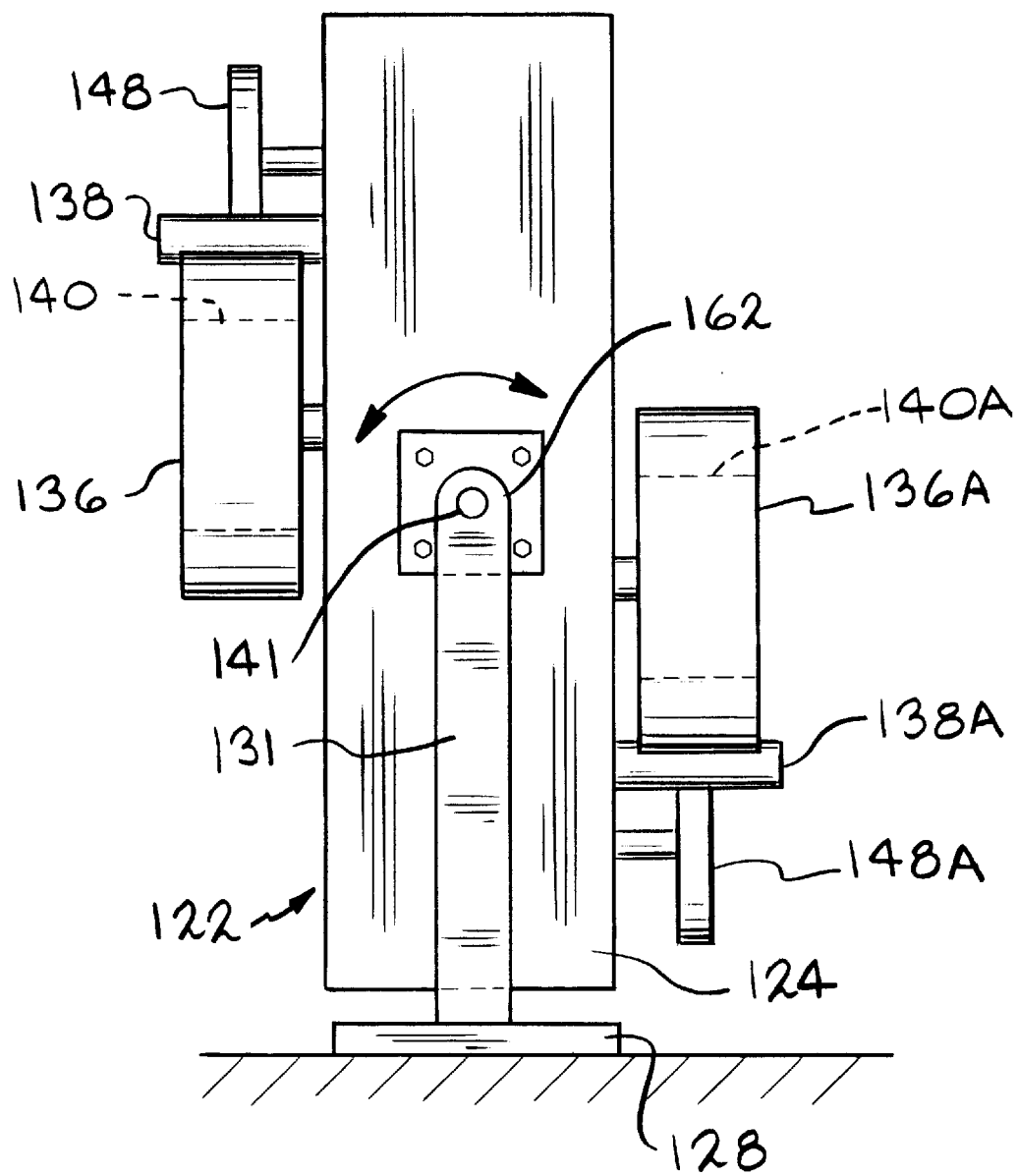
FIG. 12 is an end view of another embodiment of the invention.

FIG. 12 shows another embodiment of a multi-chopper 122 of the present invention. This embodiment comprises back up rolls 136 and 136A, idler rolls 138 and 138A, blade rolls, 140 and 140A, accelerating rolls 148 and 148A, and a square or rectangular framed enclosure 124, a base 128, arms 131 and a second arm 131A (not shown) on the opposite side of the enclosure 124, a shaft 141 held in a fixed position by arms 131 and 131A, and a rotating member 162 attached to the shaft 141. The enclosure 124 contains the same, or similar elements as the enclosure 24 shown in FIGS. 2–4. The rotating member 162 is similar to the rotating member 62 in FIG. 10 and an internal drive and gear like the drive 110 and gear 108 shown in FIG. 10 can be used to rotate the multi-chopper 122 to move one chopper assembly out of operating position and the other chopper assembly into operating position. Of course, other known means could be used to rotate the enclosure 24 in known ways to achieve the inventive concept shown here.

Figure 13:
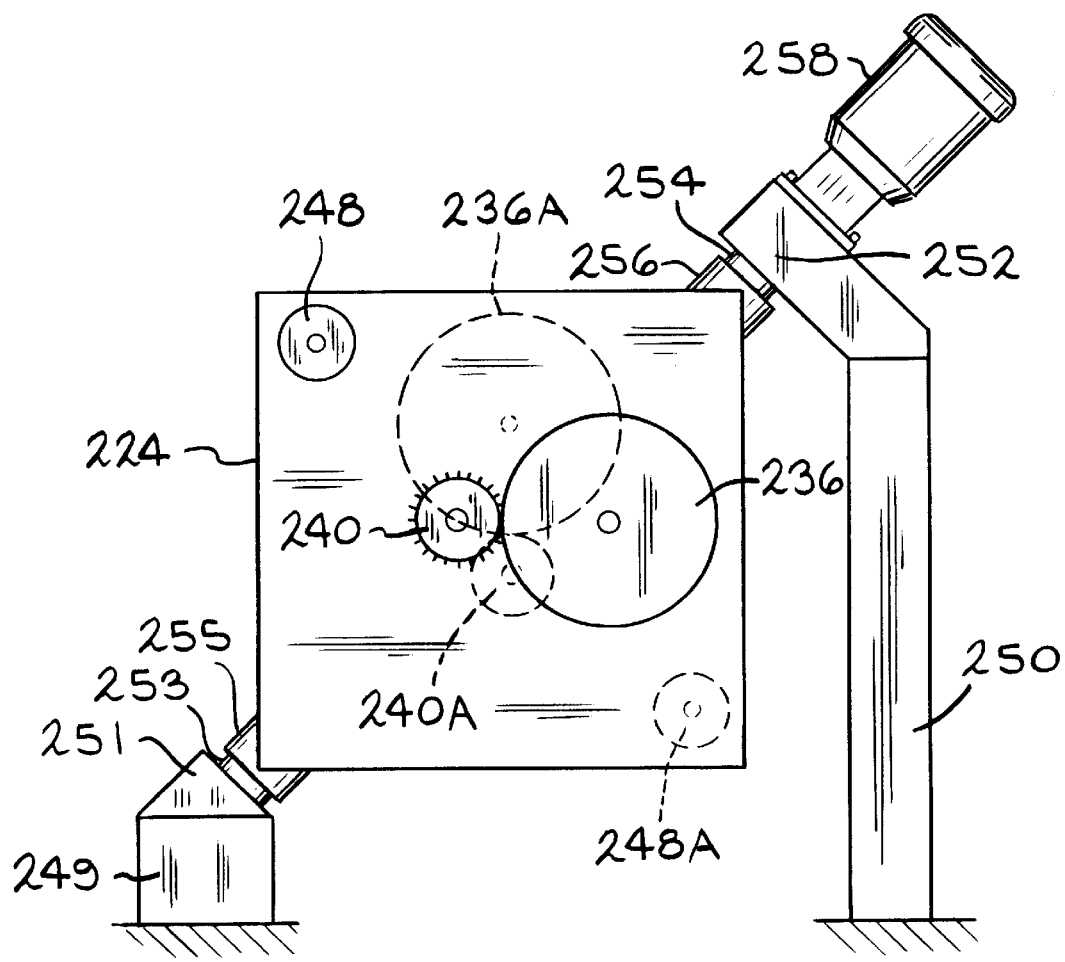
FIG. 13 is a front view of still another embodiment of the invention.

FIG. 13 shows a still further embodiment of the multi-chopper invention. In this embodiment the multi-chopper has a cubical framed enclosure 224 with chopper assemblies mounted to be adjacent two opposite sides of the enclosure 224, one side being an operating side and the opposite side being a non-operating side. In this embodiment, the enclosure 224 rotates about an axis that runs through a point located on an upper edge of the cubical enclosure, which edge extends between said opposite sides, said point being midway between the operating side and the non-operating side of the enclosure 224 and another point located midway between the operating side and the non-operating side of the enclosure 224 and on a lower edge of the cubical enclosure 224, said lower edge being diagonally opposite said upper edge. The enclosure 224 may be rotated using the means disclosed in the previous embodiments or by any other suitable means as will be obvious to one skilled in art.

In the embodiment shown in FIG. 13, the cubical enclosure is supported by one short stand 249 and one tall stand 250 having bearing mounts 251 and 252 respectively that hold shafts 253 and 254 respectively, although a single shaft extending between mounts 251 and 252 could also be used. The enclosure 224 is rigidly mounted to shafts 253 and 254 via adapters 255 and 256 respectively, and a gear on the end of shaft 254 (not shown, but inside mount 252) meshes with a gear on a drive 258. When the drive 258 is activated, it rotates the enclosure 224 first one way to move the operating chopper assembly into a non-operating position and to move the non-operating chopper assembly into an operating position, and then when activated again, it rotates the enclosure the other direction to return the original operating chopper assembly from its non-operating position to an operating position.

In the embodiment shown in FIG. 13, the non-operating chopper assembly is oriented 90 degrees from the operating chopper assembly. For example, a backup roll 236 in the operating position is nearest the upstream end of the cubical enclosure 224 (right end), while the non-operating backup roll 236A is nearest the top end of the cubical enclosure 224 and a blade roll 240, in the operating position, is to the left of the backup roll 236 while a blade roll 240A in the non-operating position is below the non-operating backup roll 236A. Also, an accelerating roll 248, in the operating position, is adjacent the upper left corner of the operating side of the cubical enclosure 224 while a non-operating accelerating roll 248A is adjacent the lower left corner of the non-operating side of enclosure 224. On this embodiment, the mast 58 (not shown in FIG. 13) supporting the bearing mounts for the blade rolls and the backup rolls can lie in a horizontal plane, in the position the enclosure is shown in FIG. 13, running below the axis of the blade roll 240 and the axis of the backup roll 236 and above the axis of the blade roll 240A. However, the mast 58 can also lie in other planes. This embodiment can also have a separate mast for each chopper assembly with one mast being in one plane and the other mast being in a different plane.

In the operation of the multi-choppers of the present invention, strands of fiber are laced into the chopper one strand at a time until all of the strands are running. Referring to FIGS. 2, 3, 4, 10 and 11, the main drive is started which starts the blade roll 40, the backup roll 36 and the idler roll 38 running on the operating chopper assembly, and the drive is adjusted to achieve the desired surface velocity on the fiber contacting surface of the backup roll 36. Blade roll 40A has previously been locked out in a stopped position. The oscillating roll 35 is started. Next, the first strand of fibers is taken from a set of pull rolls or from its source by an operator to the multi-chopper, pulled under the groove near the end of oscillating roll 35, up over starting roll 42, under the end portion of the idler roll 38, under the starter bar 44, under the turning roll 46 and up over the accelerating roll 48 which is running at a slow surface speed, only slightly higher than the normal pulling speed of the operator.

As the operator pulls the strand over the accelerating roll 48, he automatically activates a switch (proximity, photoelectric, limit, trip, etc., that is not shown) which starts a program that speeds up the accelerator at a desired rate until its surface speed matches the surface speed of the backup roll and also starts a timer which, when it times out, after a preselected number of seconds giving ample time for the new strand to accelerate to the desired speed, the timer then activates a solenoid air valve (not shown) sending high pressure air to the cylinder 117 (see FIG. 11) moving the starter bar 44 down and moving the strand 15 into the nip between the blade roll 40 and the back up roll 36. This procedure is repeated until all of the intended strands are running into the chopper and then whenever there is a strand breakout.

Figure 14:
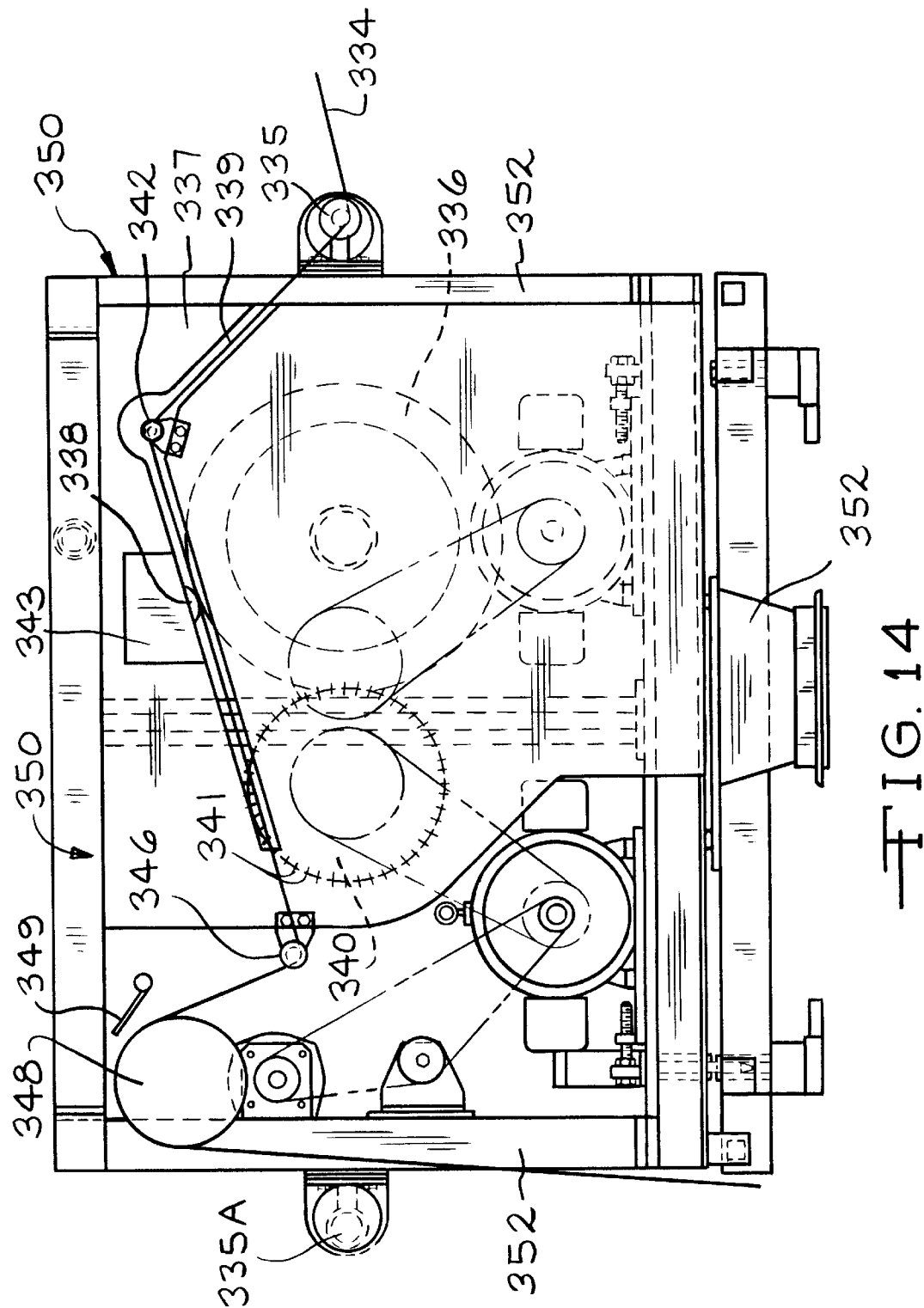
FIG. 14 is a front view of a preferred embodiment of the invention with an enclosure panel removed for better viewing.
Figure 15:
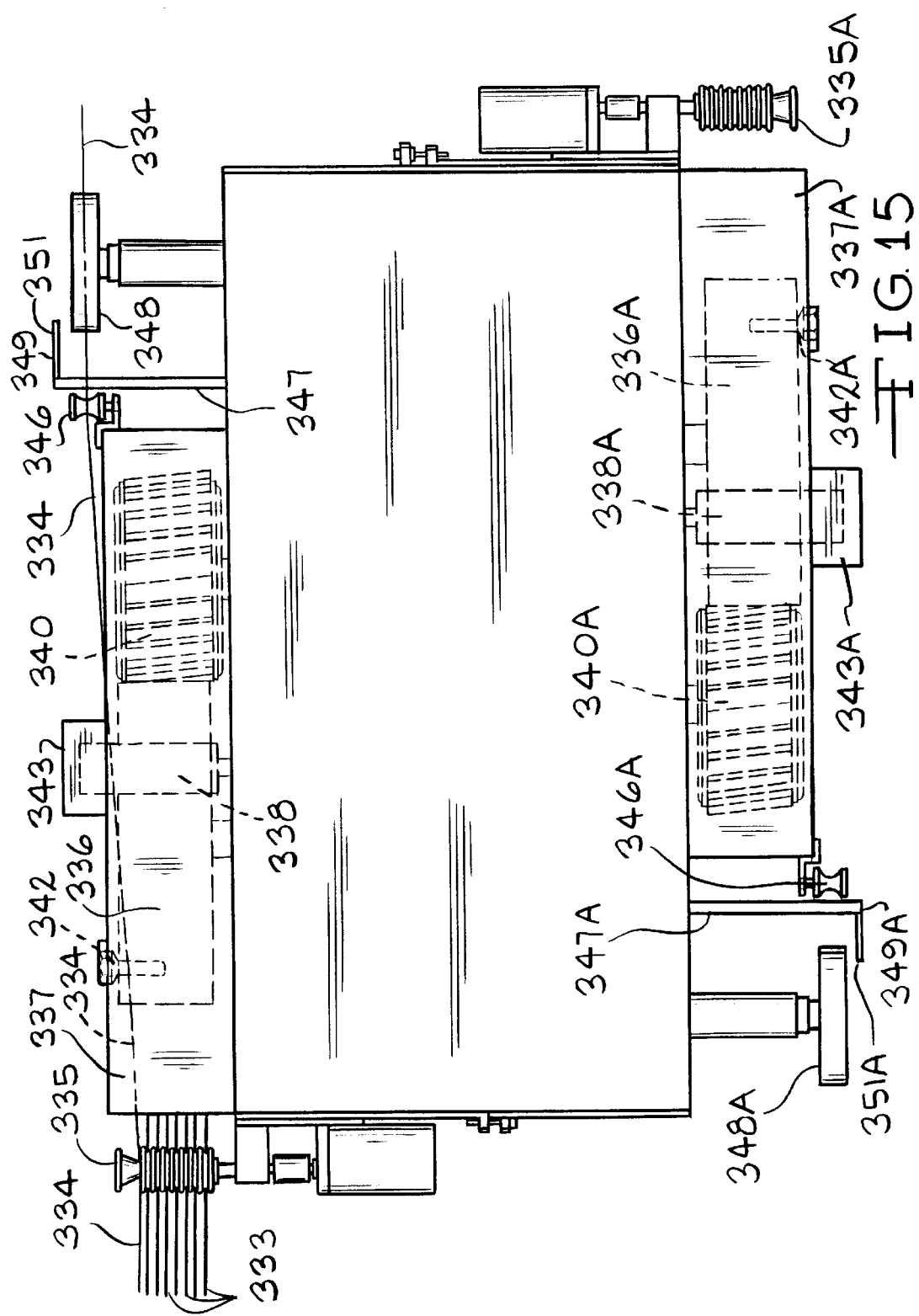
FIG. 15 is a plan view of the chopper shown in FIG. 14 with a top enclosure panel in place.
Figure 16:
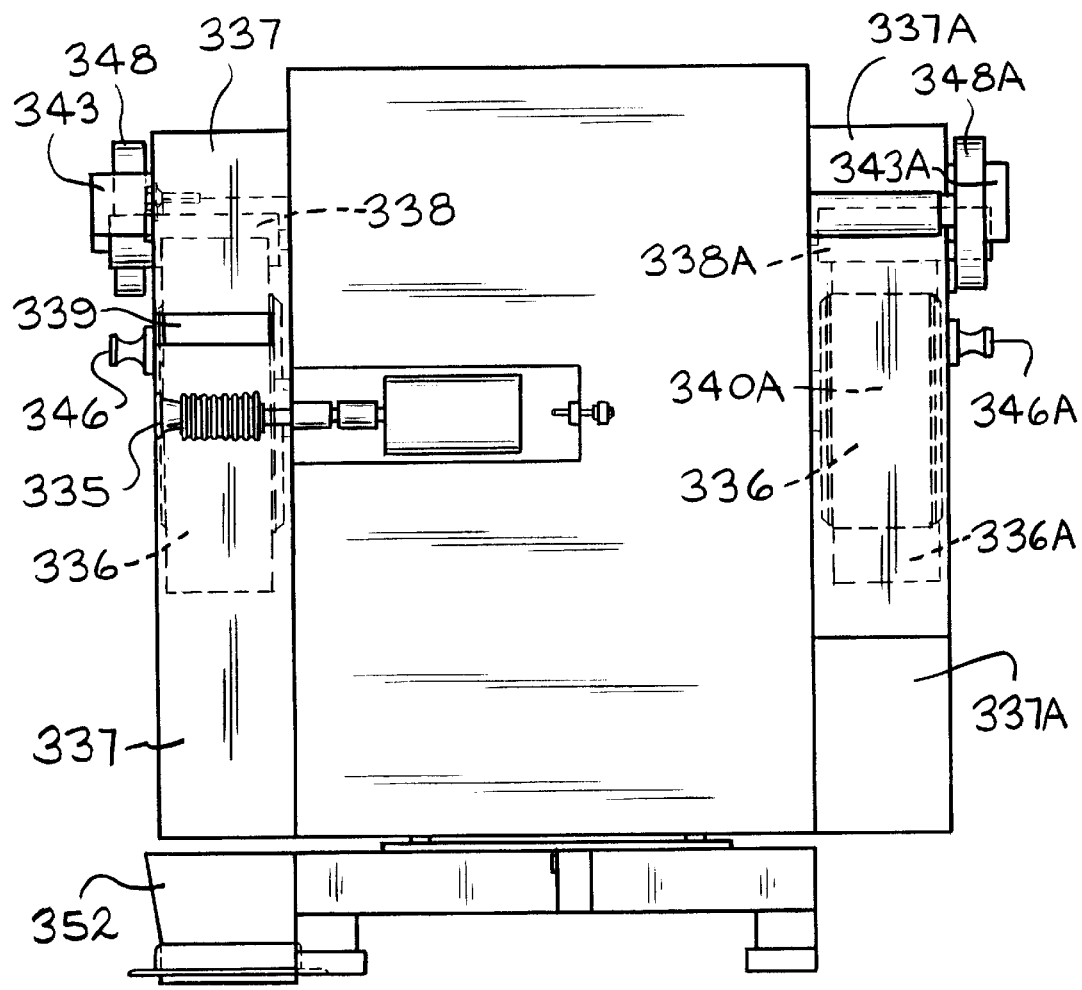
FIG. 16 is an end view of the chopper shown in FIGS. 14 and 15 with an end enclosure panel in place.

FIGS. 14–17 show a preferred arrangement for starting a new strand 334 into the chopper of the invention. FIGS. 14, 15 and 16 are front, plan, and end views respectively of the same chopper shown in FIGS. 2–9 and 10 except for the different arrangement for starting a new strand. Otherwise, the elements inside frame 350 are exactly the same as inside the frame 50 of the chopper shown in FIGS. 2–9 and 11. Also, the chopper shown in FIGS. 14–17 uses two accelerator rolls 348 and 348A instead of a winding hub shown as 119 in FIG. 4, trip switches 349 and 349A, not shown in FIGS. 2–4, are shown in FIGS. 14 and 15. Also, safety guards 337 and 337A, idler roll guards 343 and 343A and fiber chutes 352 and 352A, not shown in FIGS. 2–4 are shown in FIGS. 14–16.

As shown in FIGS. 14–16, the safety guards 337 and 337A cover backup rolls 336 and 336A, idler rolls 338 and 338A, blade rolls 340 and 340A, with chopping blades 341 and 341A, to protect the operator. The safety guards 337 and 337A each have a slot opening 339 and 339A in the front and feed end to allow running strands 333 to enter and a new strand 334 to be started into the chopper. The slots 339 and 339A end near the second starting rolls 346 and 346A and very close to where the new strand 334 passes outside the safety guards 337 and 337A as can be seen in FIG. 15. The slot is just wide enough to allow the running strands 333 and the new strand 334 to pass through without rubbing on the edges of the slot, and to observe the new strand 334, and is wider around the first starting rolls 342 and 342A to allow the operator to lace a new strand 334 onto the first starting rolls 342 or 342A. New starting rolls 342 and 342A are held in place by a bracket attached to the safety guards 337 and 337A as shown in FIGS. 14 and 17.

The first starting rolls 342 and 342A and the second starting rolls 346 and 346A are positioned such that a straight line from a top surface 361 (FIG. 17) of rolls 342 and 342A to the bottom surface of the running groove in the second starting rolls 346 and 346A respectively touches or nearly touches the bottom surface of idler rolls 338 and 338A. When the new strand 334 is first laced into the chopper for start up, strand 334 will contact or nearly contact the bottom surface of the idler roll 338 or 338A along the portion of the idler roll which extends beyond the backup roll 336 or 336A.

Figure 17:
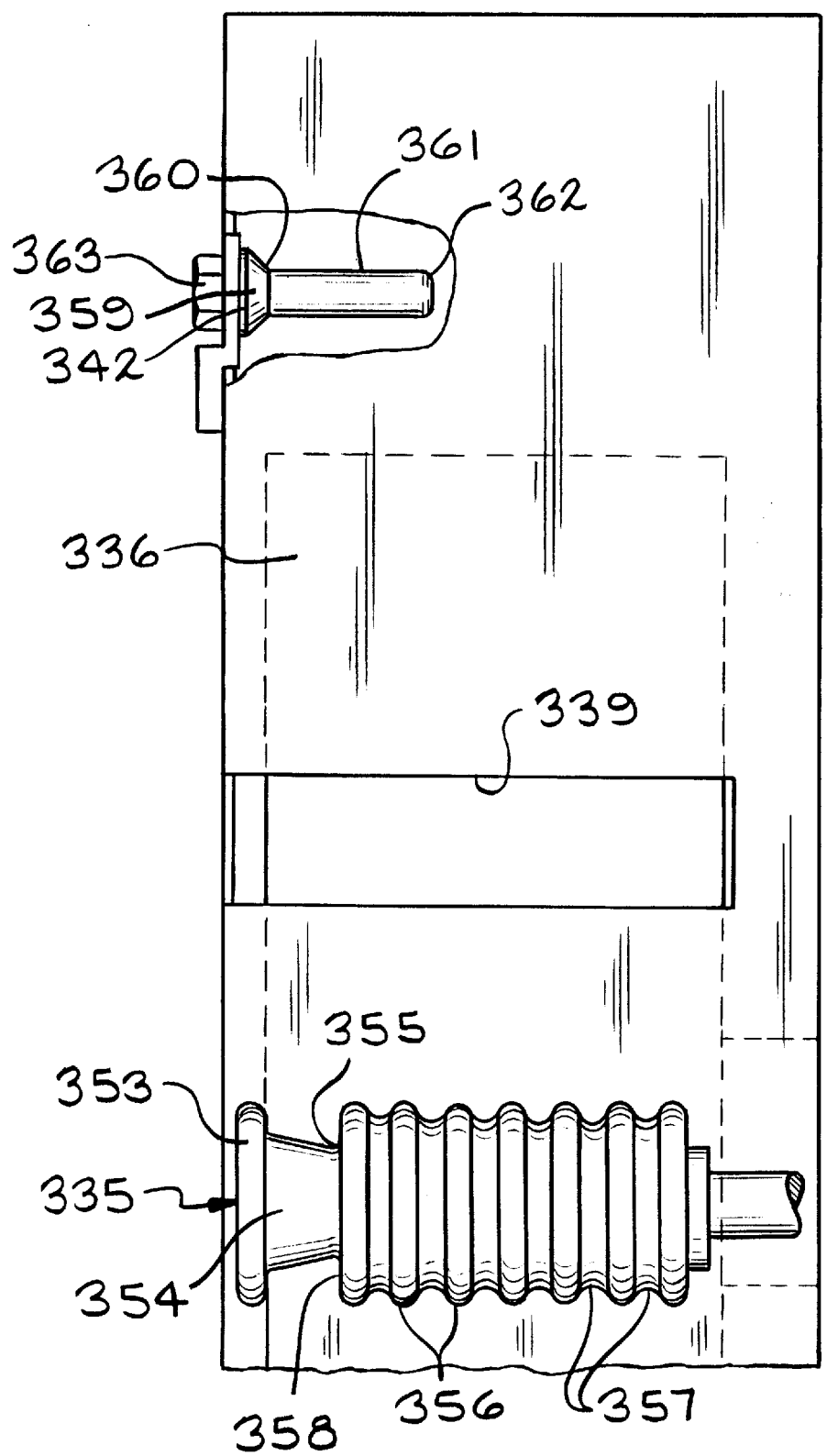
FIG. 17 is a partial end view of an oscillating roll and the chopper shown in FIGS. 14–16 with part of a safety guard cut away to better show a feature of the invention.

The oscillating rolls 335 and 335 A, shown mounted to vertical frame member 352, and the first starting rolls or shoes 342 and 342A are shaped to facilitate the preferred arrangement for starting each new strand 334 as shown in FIG. 17, which is a partial upstream end view of one side of the chopper of the invention with a portion of the safety guard 337 cut away to show the first starting roll or shoe 342. Incidentally, it is not necessary to use two oscillating rolls fastened to the chopper as shown in the Figures. One oscillating roll 335 fixedly mounted to a separate support, which support is pivotly or slidably mounted to the floor or an overhead beam in a well known manner, to allow the oscillating roll 335 to be moved away from the chopper when the latter is being rotated, is perfectly acceptable. Mounting two oscillating rolls 335 and 335A to the chopper as shown in the Figures is preferred since it allows time to inspect and repair each of these rolls when they are in a non-operating position.

Only oscillating roll 335 will be described here with the understanding that roll 335A is the same. Oscillating roll 335 can be made from a carbon or graphite material and has a rounded outer rim 353, a tapered portion 354, a radiused starting valley 355 and radiused running grooves 357 separated by rounded ridges 356. The tapered portion 354 tapers preferably at an angle of about twelve degrees, but this can vary somewhat so long as the angle is sufficient to move a new strand in contact with the tapered portion to the radiused starting valley 355 fairly quickly without making it hit end face 358 of the outboard separating ridge 356 so hard that it damages the strand. The diameter of the radiused starting valley 355 of the oscillating roll 335 is substantially smaller than the diameter of the outboard separating ridge 356 such that the new strand cannot by itself ride up into the outboard running groove 356, but will stay in the valley 355 until acted upon by an outside force. Oscillating roll 335 rotates slowly, preferably in a direction opposing the moving strands, only to avoid wearing a flat place on any portion of the roll, so the actual rotational speed is not critical so long as the surface speed is slow compared to the speed of the running strands. The radius of the radiused starting valley 355 is preferably about $\frac{1}{16}$th inch R, but this can vary depending on the size of the strand and as long as it guides the strand without damaging the fibers. The radius of the radiused running grooves 357 is preferably about $\frac{1}{8}$th inch R, but this can also vary as long as these grooves guide the strand without damaging the fibers in the strand.

The first starting rolls or shoes 342 and 342A are just alike so only 342 will be described. The first starting roll 342 is held in place by being bolted onto a bracket attached to the safety cover 337 as shown in FIGS. 14, 15 and 17. The first starting shoe or roll has a first tapered portion or transition 360 and a straight portion 361 ending above the backup roll and preferably about midway across its width or at least about one inch from the outer edge of the backup roll. The straight portion 361 has an end 362 that is radiused with about a $\frac{1}{4}$ inch R so that strands sliding off the end 362 won't be damaged or held up by a sharp edge. The straight portion 361 has a diameter preferably of about 1.25 inch and the first starting shoe is mounted fixedly so that it does not rotate. If it rotates, the strand tends to adhere to the surface of the shoe or roll and wrap which requires restarting.

As the second starting rolls 346 and 346A it is preferred to use a free wheeling roll like that described in U.S. Pat. No. 4,692,178, the disclosure of which is hereby incorporated by reference. This type of roll offers the least drag or resistance to acceleration while protecting the strand from damage. This type of roll also avoids roll wrap which can be a problem with a solid surfaced roll.

It is preferred that the safety guards 337 and 337A are hinged to the frame 50 of the chopper along the vertical downstream and inboard corner of the guards such that they swing away from the chopper at the upstream end to service backup rolls 336 and 336A and other product contacting parts. Preferably, for safety purposes, the upstream end of the safety guards 337 and 337A are locked in a closed position at the upstream end of the guards with an interlock that will not let the guards open when either of the chopper rolls 340 or 341 are running. This mechanism is not shown as it is well known in this art how to do this and it is not part of the invention.

To start a new strand into the chopper with the preferred system shown in FIGS. 14–17, the operator starts the strand at the bushing in a well known manner and carries the end of the strand towards the chopper. When he gets to the chopper he pulls the new strand 334 under the tapered portion 354 of the oscillating roll 335, over the top of the straight portion 361 of the first starting roll 342, on under the bottom surface of the portion of the idler roll 338 extending beyond the outer face of the backup roll 336, under the bottom surface of the groove in the second starting roll 346, up toward the top and a wetted surface of the accelerator roll striking and moving the lever 351 of the trip switch thus rotating the switch shaft 347 and starting a drive, which starts accelerator roll 348 turning, and on over the top, wetted surface of roll 348 pulling the strand down onto the accelerator roll 348 and releasing it in a downward direction. Keeping the working surface of the accelerator roll 348 wet provides better traction with the new strand 354, reducing slippage as the accelerator roll surface accelerates. This can be accomplished by dripping or spraying water on the surface of accelerator roll in a known manner.

The accelerator roll 348 will ramp up in speed until its surface is at the desired strand pulling speed and because of the friction between the new strand 334 and the surface of the accelerator roll 348, the strand will be accelerated to the desired pulling speed. At this time the new strand 334 is running in the starting radiused valley 355 of the oscillating roll 335, on the top surface of the straight portion 361 of the first starting roll 342, on or near the bottom surface of the idler roll 338 outboard of the outboard face of the backup roll 336, against the bottom surface of the second starting roll 346 and over the top surface of the accelerator roll 348.

When, after a few seconds, the strand is moving at the desired speed, the operator contacts the top surface of the rapidly moving new strand 334 just upstream of the oscillating roll 335 with a rod, or preferably with the palm of his bare or gloved hand, or a finger or thumb, pushes the strand down quickly and far enough to move it back beneath a desired running groove 357 in the running groove portion of the oscillating roll, and preferably about 12–18 inches. As he is doing this, the new strand 334 is moved to the radiused end 362 (an escapement for the new strand 334) of the first starting roll 342 allowing the new strand 334 to drop off the first starting roll 342 and onto the moving surface of the backup roll. It is necessary to move the strand down and over quickly such that the slack created by the new strand 334 dropping off of the show 342 is quickly taken up by the downward movement of the strand by the operator.

When the new strand 334 drops onto the upper surface of the backup roll 336, it is carried beneath the nip that the idler roll 338 makes with the backup roll 336 and on into the nip between the chopper roll 340 and the backup roll 336 where it is now in a continuous running and chopping position. The chopped fiber is thrown down into a hopper and chute 352 where it is fed to a container or a conveyor belt. As the new strand 334 is pulled into the nip between the idler roll 338 and the backup roll 336, the new strand between the second starting roll 346 and the idler roll 338 is pulled against the end of the slot 339 in the guard 337 causing the strand to break forming a downstream end and an upstream end. The downstream end is pulled over the accelerator roll 348 by the latter and is discarded. The upstream end is pulled back to the nip between the idler roll 338 and the backup roll 336 by the moving backup roll and on into the chopping nip where it is chopped along with upstream new strand 334. At this point there is no longer a new strand as it has now become a running strand 333. This method is repeated each time it is desired to start a new strand into the chopper.

When it is time to rebuild or repair the operating chopper assembly, the strands are broken upstream of the chopper and preferably, when making and cutting glass fibers, are put into a set of conventional pull rolls near the multi-chopper to keep the strands moving. As soon as all of the strands have been removed from the multi-chopper, an indexing button on a control panel (not shown) is pushed which, in sequence, shuts down the first chopper assembly, activates a valve in an air line which raises the locking rod 70 up out of the hole 72 (see FIG. 3), activates the small drive 110 (see FIG. 10) which rotates the frame 50 and moves the worn or malfunctioning chopper assembly out of operating position and moves the second, rebuilt and/or repaired chopper assembly into operating position, deactivates a valve in an air line leading to a cylinder connected to retaining rod 70A (not shown) allowing the rod 70A to enter hole 72A, and starts the main drive 99A. The rebuilt and/or repaired second chopping assembly is now ready to be laced in and production resumed. This entire stationing and relacing procedure takes about 1–2 minutes compared to at least about 5–8 minutes with the prior art choppers.

For safety and house keeping purposes metal guards or enclosure panels are placed around the frame, but they have not been shown here because they block the view of the components. It is well known how to make guards that protect the operators and equipment while allowing strands to be fed into the chopper.

While the multi-chopper is preferred for chopping glass fibers, it can also be used for cutting all types of fibers including continuous fibers, threads, or yarn of natural fiber, synthetic polymer fiber, carbon or graphite fiber, ceramic fiber and also ribbon shaped material. The chopper is most useful in a continuous fiber production operation where the fiber is chopped directly on line shortly after the fiber is formed at high speeds of thousands of feet per minute, usually exceeding 2000, 3000, 4000, 5000 feet per minute up to at least 10,000 feet per minute.

Other embodiments employing the concept and teachings of the present invention will be apparent to one skilled in the art and these are likewise intended to be within the scope of the claims. For example, although not preferred for most applications, the multi-chopper may be comprised of two separate independent choppers fastened together rigidly or flexibly, such as with short cables, belts or chains, or by being mounted to a rotating turntable such that they rotate much like a single unit having a common frame. Also, the orientation of the blade roll relative to the backup roll can be changed to cause the chopped fibers to leave the chopper in a horizontal or other direction instead of the vertically down direction shown in the embodiments illustrated above, for example see U.S. Pat. No. 3,815,461.

Further, one skilled in the art would recognize that a single drive could be used for both chopper assemblies, using two clutches with only one engaged at a time. Safety considerations for the people rebuilding the first chopper assembly while the second chopper assembly is operating caused a preference for two separate drives. Another advantage of two drives is that if one drive develops problems, the other chopper assembly can be moved into operating position and the defective drive can then be repaired or replaced while the other chopper assembly is running.

It will also be recognized that the multi-chopper could have three or more sides with a chopper assembly on each side, but it would be more costly and the higher cost might not be justified. One advantage of having more than two chopper assemblies on the multi-chopper would be that more time would be provided to rebuild the worn chopper assembly. The frame of the multi-chopper could also be cylindrical, or even spherical if desired.

We claim:

1. An apparatus for chopping fibers, strands and ribbon continuously at high speed into short lengths and into which apparatus new fibers, new strands and new ribbon can be inserted into an operating chopper assembly on the apparatus from beyond a vertical plane made by an outer vertical surface of a backup roll on the chopper assembly and into a nip between the backup roll and a blade roll while the apparatus is chopping other fibers, strands and ribbon like material at high speed comprising:

a rotatable frame, said frame comprising a three dimensional shape and at least three sides, a first chopper assembly connected to said frame and adjacent one side of said frame, a second chopper assembly connected to said frame and adjacent a second side of said frame, said frame being rotatable to move said first chopper assembly out of an operating position and into a non-operating position while moving said second chopper assembly out of a non-operating position and into said operating position, and a drive, mounted in or on said frame, for driving each chopper assembly to chop said fibers, ribbon and strands as the fibers, ribbon and strands pass generally perpendicular to blades located in the blade roll.

2. The apparatus of claim 1 wherein said frame is rotated around a vertical line.

3. The apparatus of claim 2 wherein said frame comprises a rotatable member, which member is also mounted to a base such that said frame can be rotated on said base.

4. The apparatus of claim 3 wherein said frame is a cube or a rectangular polyhedron.

5. The apparatus of claim 4 wherein said frame has a rigid vertical mast mounted therein for supporting a blade roll or chopper roll of each chopper assembly.

6. The apparatus of claim 5 wherein said mast comprises two opposite large faces, each of said faces having at least one inset portion with a machined surface generally parallel to said large face for supporting a blade roll or a chopper roll of each chopper assembly.

7. The apparatus of claim 5 wherein said mast comprises two opposite large surfaces, each of said large surfaces having two separate inset portions with each portion having a machined surface generally parallel to said large surface for supporting a blade roll or a chopper roll of a chopper assembly.

8. The apparatus of claim 7 wherein said frame has a locking means for locking said frame into a fixed position with respect to rotation when a chopper assembly is running.

9. The apparatus of claim 1 wherein said frame rotates around a horizontal line.

10. The apparatus of claim 1 wherein said frame is a cube and rotates around a line extending between midpoints of two opposite edges of said cube.

11. A method of making chopped fiber, chopped strand or chopped ribbon by pulling fibers, strands, or ribbons and new fibers, strands or ribbons into a nip of a chopper, said chopper comprised of a blade roll and a backup roll, said nip being between said blade roll and said backup roll, pulling each new fiber, strand or ribbon into said nip from beyond a vertical plane formed by an outer vertical face of said backup roll while the chopper is chopping other fibers, strands or ribbons, which chopper must be periodically repaired, the improvement comprising using a chopper comprised of a rotatable frame, said frame having a three dimensional shape having at least three sides, a first chopper assembly connected to said frame and adjacent one side of said frame, a second chopper assembly connected to said frame and adjacent a second side of said frame, said frame being rotatable to move said first chopper assembly out of an operating position and into a non-operating position while moving said second chopper assembly out of a non-operating position and into an operating position, and a drive mounted in or on said frame for driving each chopper assembly to chop said fibers, strands or ribbons as the fibers, strands or ribbons pass generally perpendicular to blades located in the blade roll.

12. The method of claim 11 wherein when said chopper is first shut down for repair, said frame is rotated in one direction around said line to move a repaired chopper assembly into operating position and when said chopper is next shut down for repair, said frame is rotated in the opposite direction to move a repaired chopper into operating position.

13. The method of claim 12 wherein said frame is always rotated in the same direction.

14. The method of claim 11, wherein said frame is rotated around a vertical line.

15. The method of claim 11 wherein said frame is rotated around a horizontal line.

16. The method of claim 11 wherein said frame is a cube and wherein said frame is rotated around a line extending between midpoints of two opposite edges of said cube.

17. The method of claim 11 wherein said fiber is glass fiber.

18. The apparatus of claim 1 wherein the blades are spaced apart and mounted in an outer surface of the blade roll, the blades being aligned generally parallel to an axis of said blade roll, and wherein the blade roll is mounted near one end of a blade roll shaft, said blade roll shaft being supported only on one side of the blade roll by members attached to said frame.

19. The method of claim 11 wherein the blades are spaced apart and mounted in an outer surface of the blade roll, the blades being aligned generally parallel to an axis of said blade roll, and wherein the blade roll is mounted near one end of a blade roll shaft, said blade roll shaft being supported only on one side of the blade roll by members attached to said frame.

* * * * *